(12) United States Patent
Cho et al.

(10) Patent No.: US 9,413,436 B2
(45) Date of Patent: Aug. 9, 2016

(54) METHOD AND APPARATUS FOR DETERMINING TRIGGER CONDITION FOR CLIENT COOPERATION IN WIRELESS COMMUNICATION SYSTEM

(71) Applicant: LG Electronics Inc., Seoul (KR)

(72) Inventors: Heejeong Cho, Anyang-si (KR); Eunjong Lee, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/414,325

(22) PCT Filed: Mar. 19, 2013

(86) PCT No.: PCT/KR2013/002236
§ 371 (c)(1),
(2) Date: Jan. 12, 2015

(87) PCT Pub. No.: WO2014/027732
PCT Pub. Date: Feb. 20, 2014

(65) Prior Publication Data
US 2015/0215008 A1  Jul. 30, 2015

Related U.S. Application Data

(60) Provisional application No. 61/682,327, filed on Aug. 13, 2012.

(51) Int. Cl.
*H04M 3/00* (2006.01)
*H04B 7/02* (2006.01)
(Continued)

(52) U.S. Cl.
CPC ............... *H04B 7/026* (2013.01); *H04B 7/024* (2013.01); *H04W 8/005* (2013.01); *H04W 40/12* (2013.01); *H04W 40/20* (2013.01); *H04W 40/22* (2013.01); *H04W 76/023* (2013.01); *H04W 88/04* (2013.01)

(58) Field of Classification Search
CPC ........................................................ H04B 7/026
USPC ........................................................... 455/418
See application file for complete search history.

(56) References Cited

U.S. PATENT DOCUMENTS

2009/0073916 A1* 3/2009 Zhang ................ H04B 7/15542
370/315
2009/0088118 A1* 4/2009 Slattery .................. H04B 15/02
455/310

(Continued)

FOREIGN PATENT DOCUMENTS

KR    1020120035871    4/2012
KR    1020120041143    4/2012

OTHER PUBLICATIONS

Rakesh Taori, "Hierarchical Network Study Report," IEEE 802.16 Broadband Wireless Access Group, IEEE 802.16-12-0136-00-Gdoc, Jan. 18, 2012.

(Continued)

*Primary Examiner* — Santiago Garcia
(74) *Attorney, Agent, or Firm* — Dentons US LLP

(57) ABSTRACT

A method and apparatus for determining candidate cooperative devices of client cooperation in a wireless communication system is provided. In addition, a method and apparatus for determining candidate source devices of client cooperation in a wireless communication system is provided. In addition, a method and apparatus for determining cooperative devices of client cooperation in a wireless communication system is provided. The client cooperation helps a source device communicating with a base station through a cooperative device.

5 Claims, 11 Drawing Sheets

(51) Int. Cl.
*H04W 8/00* (2009.01)
*H04W 40/12* (2009.01)
*H04W 40/20* (2009.01)
*H04W 40/22* (2009.01)
*H04W 76/02* (2009.01)
*H04W 88/04* (2009.01)

(56) References Cited

U.S. PATENT DOCUMENTS

| | | | | |
|---|---|---|---|---|
| 2010/0113038 | A1* | 5/2010 | Eskicioglu | H04W 48/20 455/446 |
| 2010/0189048 | A1* | 7/2010 | Baker | H04L 5/0037 370/329 |
| 2011/0210843 | A1* | 9/2011 | Kummetz | G01S 5/0289 340/517 |
| 2011/0211563 | A1* | 9/2011 | Herrala | G01S 1/68 370/338 |
| 2012/0108165 | A1* | 5/2012 | Sawamoto | H04B 7/15535 455/11.1 |
| 2012/0142345 | A1 | 6/2012 | Choi et al. | |
| 2012/0157139 | A1 | 6/2012 | Noh et al. | |
| 2012/0208599 | A1* | 8/2012 | Tanaka | H04B 7/024 455/561 |
| 2013/0310094 | A1* | 11/2013 | Ho | H04W 52/143 455/502 |

OTHER PUBLICATIONS

Inuk Jung et al., "Comments and Text Proposal on Study Report on Hierarchical Networks," IEEE 802.16 Broadband Wireless Access Group, IEEE 802.16ppp-10/0062r2, Sep. 15, 2010.

* cited by examiner

FIG. 3

| frame control | duration /ID | address 1 | address 2 | address 3 | sequence control | address 4 | sequence control | QoS control | HT control | frame body | FCS |

METHOD AND APPARATUS FOR DETERMINING TRIGGER CONDITION FOR CLIENT COOPERATION IN WIRELESS COMMUNICATION SYSTEM

This application is a 35 USC §371 National Stage entry of International Application No. PCT/KR2013/002236 filed on Mar. 19, 2013, and claims priority to U.S. Provisional Application No. 61/682,327 filed on Aug. 13, 2012, all of which are hereby incorporated by reference in their entireties as if fully set forth herein.

BACKGROUND OF THE INVENTION

1. Field of the Invention

The present invention relates to wireless communications, and more particularly, to a method and apparatus for determining a trigger condition for client cooperation in a wireless communication system.

2. Related Art

With the advent of a ubiquitous environment, there is a rapid increase in a demand for receiving a seamless service anytime anywhere by using equipments. In order to satisfy such a demand, a client cooperation technique may be introduced in a wireless communication system. The client cooperation technique refers to a technique by which a specific device helps transmission of another device. That is, one device may directly communicate with a base station (BS) or may indirectly communication with the BS by the aid of another device. A source device refers to a device which communicates with the BS through a connection with another device. A cooperation device refers to a relay entity which helps the source device to communicate with the BS.

The client cooperation technique has an effect of lower power consumption. In terms of a device, a path-loss can be decreased by the client cooperation technique, thereby being able to decrease transmit power. In terms of a network, total network power consumption can be decreased. In addition, the client cooperation technique has an effect of throughput enhancement. In terms of a device, a source device can use a good-quality link between a cooperation device and a BS and between BSs. In addition, an antenna extension gain can be obtained. In terms of the network, network capacity can be increased by using client clustering based on frequency reuse without an additional infrastructure.

The client cooperation technique can be more effectively used in a multi-radio access technology (RAT) device. The multi-RAT device refers to a device that can operate in a plurality of communication systems. For example, the multi-RAT device can operate both in institute of electrical and electronics engineers (IEEE) 802.16m and IEEE 802.11. To provide an easiness access to the BS anytime anywhere and to maintain effective performance, the multi-RAT device can use a multi-RAT client cooperation technique (i.e., improved tethering) in a heterogeneous network.

In order for a certain device which is under communication by being directly connected to a BS to perform communicate by being indirectly connected to the BS according to client cooperation by the aid of another device, a special trigger is required for communicating with the BS according to the client cooperation. That is, a special trigger condition must be satisfied to perform the client cooperation.

Accordingly, there is a need for a method of determining a trigger condition for client cooperation and an operation between a BS and a device when the trigger condition is satisfied.

SUMMARY OF THE INVENTION

The present invention provides a method and apparatus for determining a trigger condition for client cooperation in a wireless communication system. The present invention also provides a method of determining a trigger condition based on quality between a base station and each device in order to perform client cooperation. In addition, the present invention also provides an operation between a base station and a device when a trigger condition is satisfied.

In an aspect, a method for determining, by a base station, candidate cooperative devices of client cooperation in a wireless communication system, the client cooperation helping a source device communicating with the base station through a cooperative device, is provided. The method includes determining whether or not a device can be a candidate cooperative device if a quality of a direct link between the base station and the device is higher than a threshold, and transmitting a request for performing as the candidate cooperative device to the determined device as the candidate cooperative device.

In another aspect, a method for determining, by a base station, candidate source devices of client cooperation in a wireless communication system, the client cooperation helping a source device communicating with the base station through a cooperative device, is provided. The method includes determining a device as a candidate source device if a quality of a direct link between the base station and the device is equal to or lower than a threshold, and indicating to perform a neighbor discovery procedure to the determined device as the candidate source device.

In another aspect, a method for determining, by a base station, cooperative devices of client cooperation in a wireless communication system, the client cooperation helping a source device communicating with the base station through a cooperative device, is provided. The method includes selecting the cooperative device among candidate cooperative devices if at least one of activation trigger conditions is satisfied, and indicating to activate the client cooperation or to perform a connection establishment procedure with the selected cooperative device to a candidate source device.

A trigger condition can be used to effectively determine whether each device performs client cooperation.

BRIEF DESCRIPTION OF THE DRAWINGS

FIG. 3 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.11 are chiefly described as an example in order to clarify the description, but the technical spirit of the present invention is not limited to IEEE 802.16m and IEEE 802.11.

Figure 1:
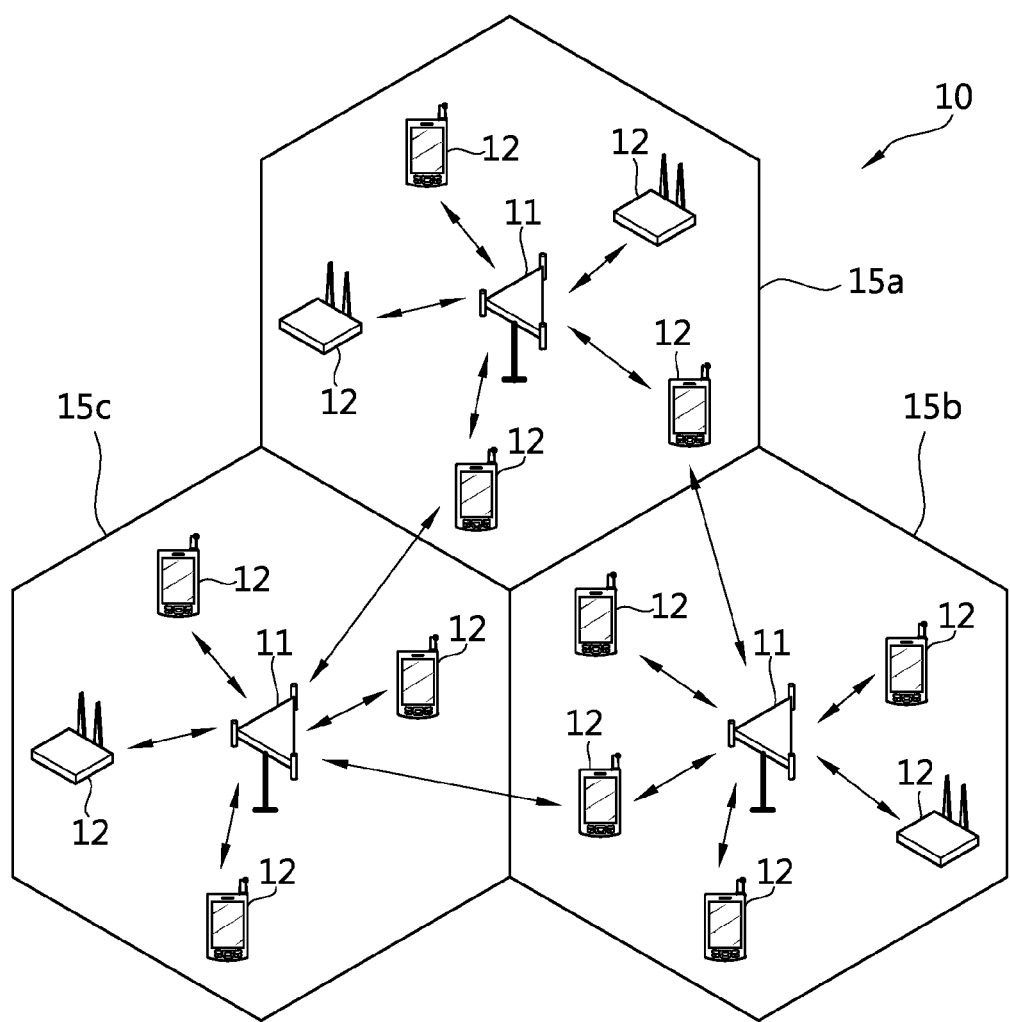
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
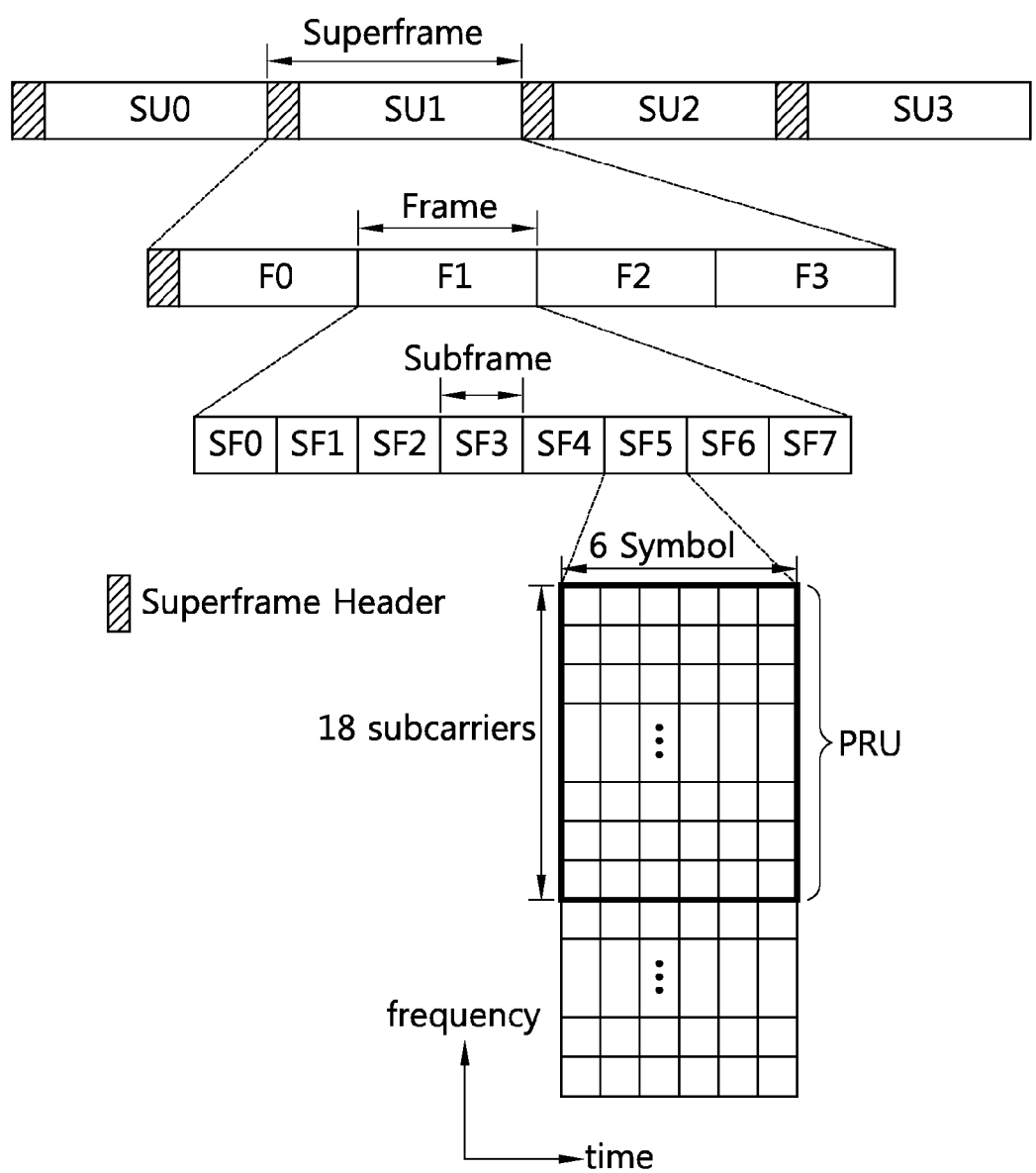
FIG. 2 shows an example of a frame structure of IEEE 802.16m.

FIG. 2 shows an example of a frame structure of IEEE 802.16m.

Referring to FIG. 2, a superframe (SF) includes a superframe header (SFH) and four frames F0, F1, F2, and F3. Each frame may have the same length in the SF.

Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time, $T_b$(μs) | | | 91.4 | 128 | 102.4 | 91.4 | 91.4 |
| G = 1/8 | Symbol time, $T_s$(μs) | | 102.857 | 144 | 115.2 | 102.857 | 102.857 |
| | FDD | Number of ODFMA symbols per 5 ms frame | 48 | 34 | 43 | 48 | 48 |
| | | Idle time(μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of ODFMA symbols per 5 ms frame | 51 | 36 | 45 | 51 | 51 |
| | | Idle time (μs) | 45.71 | 104 | 104 | 45.71 | 45.71 |
| | TDD | Number of ODFMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, $T_s$(μs) | | 114.286 | 160 | 128 | 114.286 | 114.286 |
| | FDD | Number of ODFMA symbols per 5 ms frame | 43 | 31 | 39 | 43 | 43 |
| | | Idle time(μs) | 85.694 | 40 | 8 | 85.694 | 85.694 |
| | TDD | Number of ODFMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)×8000. A subcarrier spacing is defined as $\Delta f = F_s/NFFT$. A useful symbol time is defined as $T_b=1/\Delta f$. A CP time is defined as $T_g=G \cdot T_b$. An OFDMA symbol time is defined as $T_s=T_b+T_g$. A sampling time is defined as $T_b/N_{FFT}$.

FIG. 3 shows an example of a frame structure of IEEE 802.11.

A frame of IEEE 802.11 includes a set of fields in a fixed order. Referring to FIG. 3, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A deauthentication frame is used to finish an authentication relation. An association request frame is transmitted so that the mobile station participates in the network when the mobile station recognizes the compatible network and is authenticated. An association response frame is a response for the association request frame. A deassociation frame is used to finish an association relation.

Three states may exist according to an authentication and association procedure in IEEE 802.11. Table 2 below shows the three states of IEEE 802.11.

TABLE 2

|  | Authentication | Association |
|---|---|---|
| State 1 | X | X |
| State 2 | O | X |
| State 3 | O | O |

To transmit a data frame, a device must perform the authentication and association procedure with respect to a network. In Table 2, a procedure of transitioning from the state 1 to the state 2 can be called the authentication procedure. The authentication procedure can be performed in such a manner that one device acquires information of a different device and authenticates the different device. The information of the different device can be acquired by using two methods, i.e., a passive scanning method for acquiring information of a different node by receiving a beacon frame and an active scanning method for acquiring the information of the different device by transmitting a probe request message and receiving a probe response message received in response thereto. The authentication procedure can be complete by exchanging an authentication request frame and an authentication response frame.

In Table 2, a procedure of transitioning from the state 2 to the state 3 can be called the association procedure. The association procedure can be complete when two devices exchange the association request frame and the association response frame upon completion of the authentication procedure. An association ID can be allocated by the association procedure.

Hereinafter, a client cooperation technique will be described. Hereinafter, a source device refers to a device which communicates with the BS through a connection with another device. A cooperation device refers to a relay entity which helps the source device to communicate with the BS.

Figure 4:
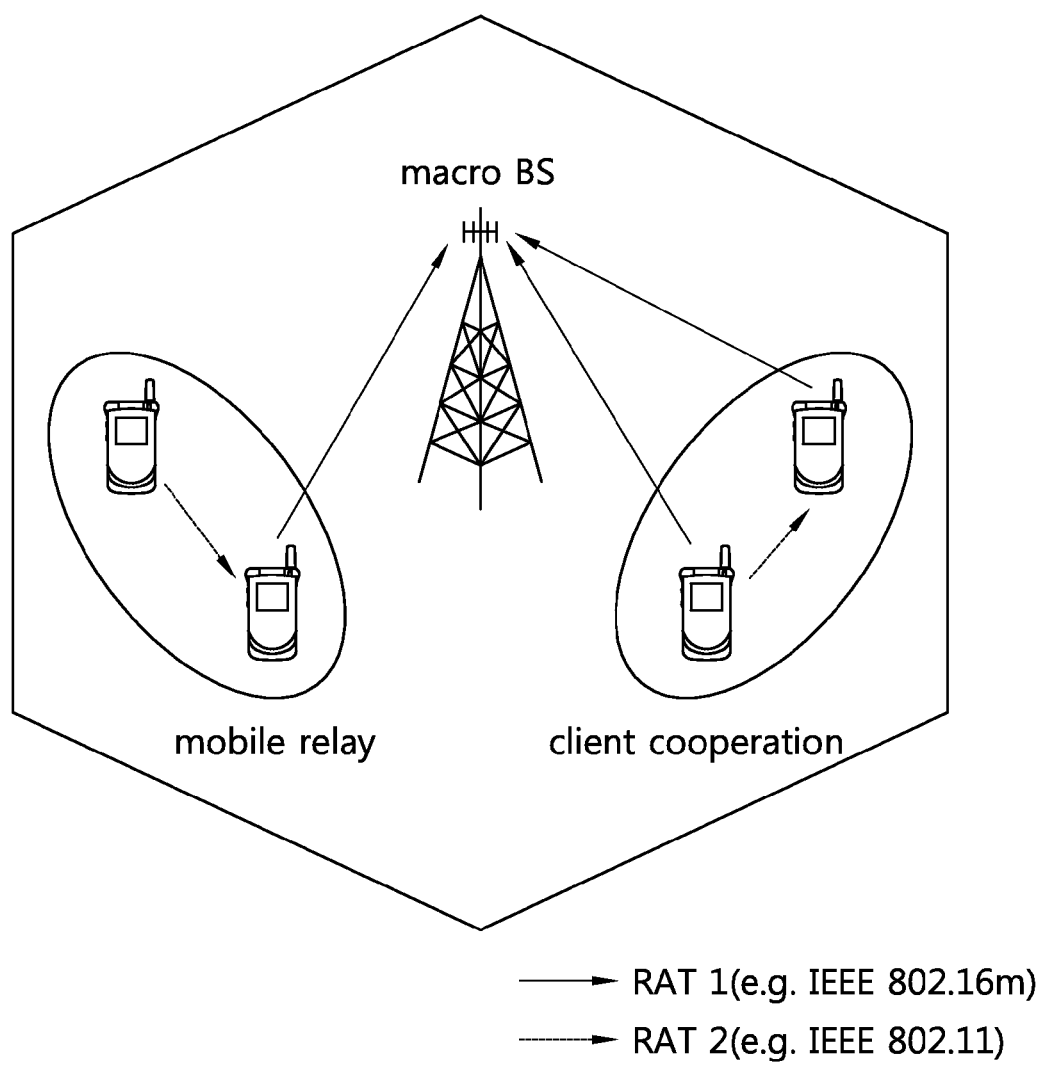
FIG. 4 shows an example of implementing a client cooperation technique.

FIG. 4 shows an example of implementing a client cooperation technique.

Referring to FIG. 4, in the client cooperation technique, a source device can directly communicate with a macro BS, or can communicate with the macro BS via a cooperation device. The cooperation device may directly communicate with the macro BS, or can help communication of the source device. This is different from a mobile relay in a sense that the source device can directly communicate with the macro BS. In this case, each device and the macro BS can communicate by using a first radio access technology (RAT), and the source device and the cooperation device can communicate by using a second RAT. The first RAT may be a radio technology such as IEEE 802.16, IEEE 802.16m or IEEE 802.20, etc. Alternatively, the first RAT may be a radio technology such as E-UTRA, 3GPP LTE or 3GPP LTE-A, etc. The second RAT may be IEEE 802.11.

Figure 5:
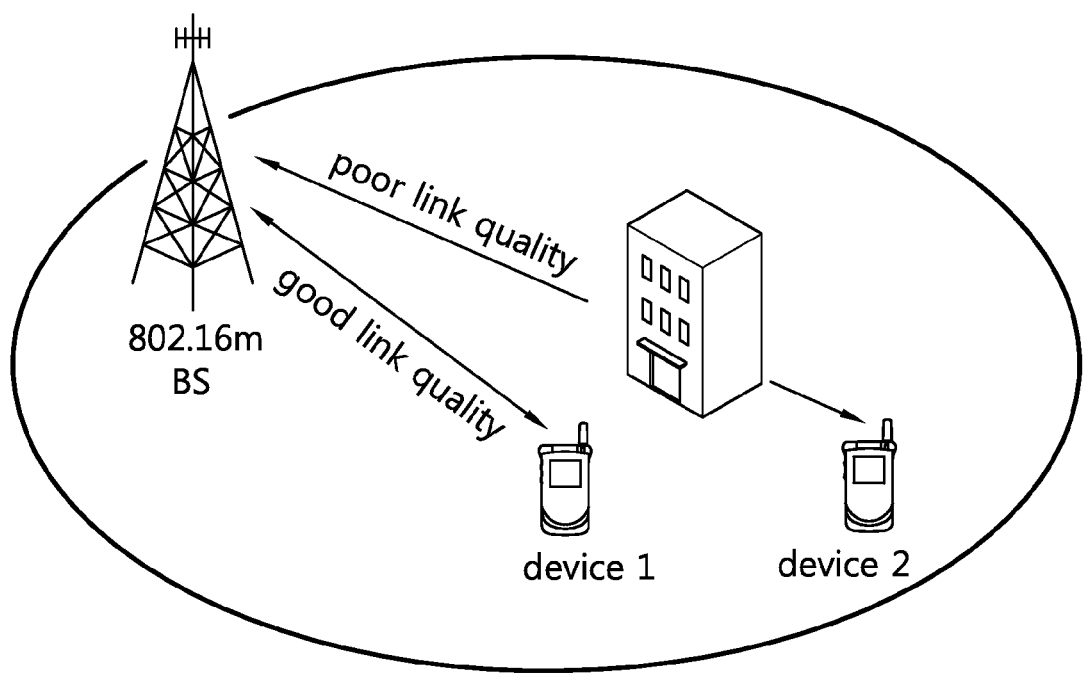
FIG. 5 shows another example of implementing a client cooperation technique.

FIG. 5 shows another example of implementing a client cooperation technique.

The client cooperation technique can be more effectively used in a multi-RAT device. The multi-RAT device refers to a device that can operate in a plurality of communication systems. For example, the multi-RAT device can operate both in IEEE 802.16m and IEEE 802.11. When the multi-RAT device uses the client cooperation technique, the multi-RAT device can communicate with an IEEE 802.16m BS by using a plurality of RATs. For example, as shown in FIG. 5, if channel quality is poor between a second device and a BS or if the second device located in a shadow area cannot receive a signal from the BS, the first device can be used as a cooperation device to communicate with the BS. In this case, each device and the BS can communicate by using the first RAT, and the source device and the cooperation device can communicate by using the second RAT. The first RAT may be a radio technique such as IEEE 802.16, IEEE 802.16m, IEEE 802.20, E-UTRA, 3GPP LTE or 3GPP LTE-A, etc. The second RAT may be IEEE 802.11.

Figure 6:
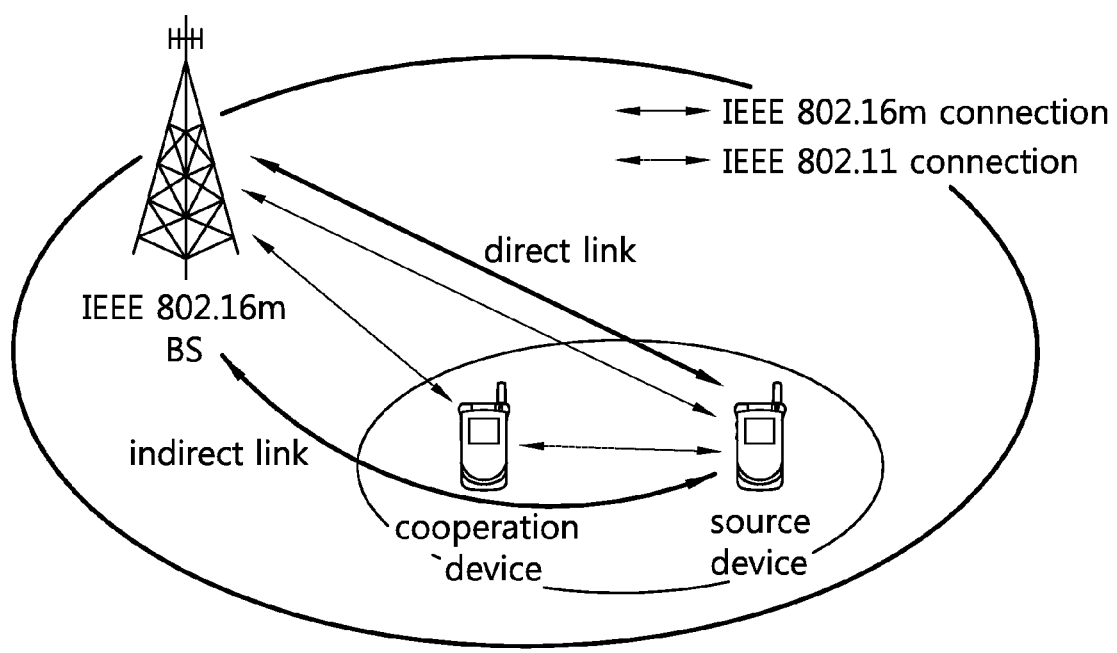
FIG. 6 shows another example of implementing a client cooperation technique.

FIG. 6 shows another example of implementing a client cooperation technique.

Referring to FIG. 6, a source device and a macro BS (e.g., IEEE 802.16m BS) can be connected through a direct link, and can be connected through an indirect link by using a cooperation device. In this case, each device and the BS can be connected by using IEEE 802.16m, and the source device and the cooperation device can be connected by using IEEE 802.11.

A trigger condition can be defined so that a plurality of devices perform the client cooperation technique. More particularly, the plurality of devices can be candidates capable of operating as a source device and a cooperation device for the client cooperation technique when a specific trigger condition is satisfied. In addition, the candidates capable of operating as the source device and the cooperation device can operate as the source device and the cooperation device for performing client cooperation when a specific trigger condition for activating the execution of the client cooperation is satisfied.

Trigger conditions for selecting a candidate group of source devices and a candidate group of cooperation devices for client cooperation will be described. Hereinafter, the candidate group of source devices for the client cooperation is called a candidate source device, and the candidate group of cooperation devices for the client cooperation is called a candidate cooperation device.

First, a trigger condition for selecting a candidate cooperation device will be described. In order for a certain device to be the candidate cooperation device, link quality between the device and a BS must be sufficiently good. This is because the good link quality is necessary for the existence of a trigger by which a source device connected with the BS through a direct link communicates with the BS through an indirect link by using a cooperation device instead of the direct link. Accordingly, in order to be the candidate cooperation device, quality of a direct link between a specific device and the BS must be higher than a certain threshold. In this case, for convenience of explanation, the threshold is called a first threshold, and if the quality of the direct link between the specific device and the BS is higher than the first threshold, it can be said that a first trigger condition is satisfied.

Figure 7:
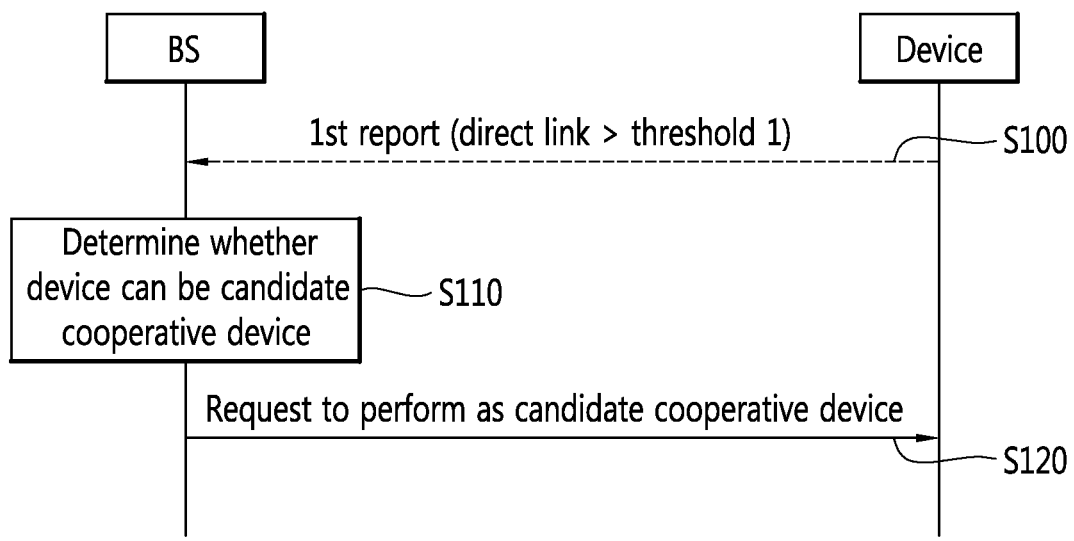
FIG. 7 shows an example of a method of determining a candidate cooperation device for client cooperation according to an embodiment of the present invention.

FIG. 7 shows an example of a method of determining a candidate cooperation device for client cooperation according to an embodiment of the present invention.

In step S100, if quality of a direct link between a specific device and a BS is higher than a first threshold, the specific device can report this to the BS. This is called a first report for convenience of explanation. In this case, the device can send the first report according to a profile of the device. For example, the first report can be sent to the BS only when the device supports the client cooperation and can operate as the candidate cooperation device.

In step S110, the BS determines whether the specific device can be the candidate cooperation device. The BS can determine whether the specific device can be the cooperation candidate device after receiving the first report from the specific device in step S100. That is, the determining of the candidate cooperation device is initiated by the specific device. Alternatively, if quality of a direct link with the specific device is higher than a first threshold, the BS can determine whether the specific device can be the candidate cooperation device instead of receiving the first report from the specific device. That is, the determining of the candidate cooperation device is initiated by the BS. In this case, the device may be limited to a device which supports client cooperation and which can operate as the candidate cooperation device.

The BS determines whether a specific device which satisfies the first trigger condition can be the candidate cooperation device. In a state where the specific device has already satisfied the first trigger condition, the BS determines whether the specific device can be the candidate cooperation device by considering the following aspects.

Whether the specific device supports the client cooperation: This is because the specific device must support the client cooperation in order to be the candidate cooperation device. This is a prerequisite for determining the candidate cooperation device.

Whether the specific device can operate as the cooperation device of the current client cooperation: The specific device may not be able to operate as the cooperation device of the client cooperation due to a situation of the specific device itself.

A movement speed of the specific device: The BS can determine that the specific device satisfies a condition for being the candidate cooperation device, for example, if the specific device does not move or moves at a slow speed.

A power reserve amount of the specific device: The BS can determine that the specific device satisfies the condition for being the candidate cooperation device, for example, if a power reserve amount of the specific device is greater than or equal to 70%.

A location of the specific device and a presence and the number of candidate cooperation devices neighboring to the specific device: The BS can determine that the specific device satisfies the condition for being the candidate cooperation device, for example, if a certain device is neighboring to a candidate source device, and if there is no proper neighboring cooperation device or if an additional source device cannot be accepted even if the presence of the proper neighboring cooperation device.

In step S120, the BS can request the specific device to take a role of the candidate cooperation device if it is determined that the specific device satisfies the condition for being the candidate cooperation device. The specific device may accept or reject such a request of the BS.

A trigger condition for selecting a candidate source device will be described. In order for a certain device to be the candidate source device, link quality between the device and a BS must be sufficiently poor. This is because the poor link quality is necessary for the existence of a trigger by which a source device connected with the BS through a direct link communicates with the BS through an indirect link by using a cooperation device instead of the direct link. Accordingly, in order to be the candidate source device, quality of a direct link between a specific device and the BS must be lower than a certain threshold. In this case, for convenience of explanation, the threshold is called a second threshold, and if the quality of the direct link between the specific device and the BS is lower than or equal to the second threshold, it can be said that a second trigger condition is satisfied.

Figure 8:
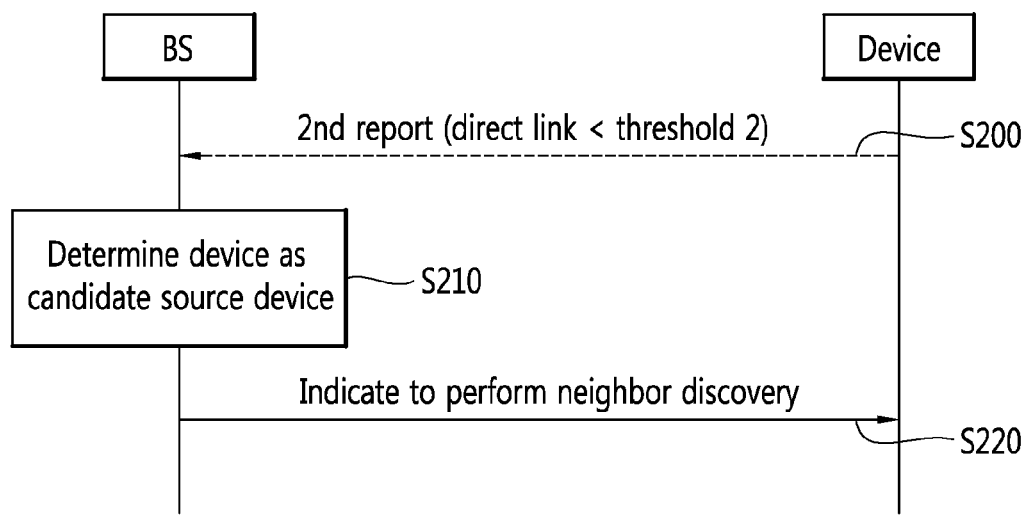
FIG. 8 shows an example of a method of determining a candidate source device for client cooperation according to an embodiment of the present invention.

FIG. 8 shows an example of a method of determining a candidate source device for client cooperation according to an embodiment of the present invention.

In step S200, if quality of a direct link between a specific device and a BS is lower than or equal to a second threshold, the specific device can report this to the BS. This is called a second report for convenience of explanation. In this case, the device can send the second report according to a profile of the device. For example, the second report is sent to the BS only when the device supports the client cooperation.

In step S210, the BS can select the specific device as the candidate source device for performing the client cooperation, and can instruct the specific device to perform a neighbor discovery procedure for the client cooperation. After receiving the second report from the specific device in step S200, the BS can instruct the specific device to perform the neighbor discovery procedure for the client cooperation. That is, the neighbor discovery procedure is initiated by the specific device. Alternatively, if quality of a direct link with the specific device is lower than or equal to the second threshold, the BS can select the specific device as the candidate source device for performing the client cooperation instead of receiving the second report from the specific device and can instruct the specific device to perform the neighbor discovery procedure for the client cooperation. That is, the neighbor discovery procedure is initiated by the BS. In this case, the device can be limited to a device which supports the client cooperation. The specific device can perform the neighbor discovery procedure either under the instruction of the BS or autonomously.

Figure 9:
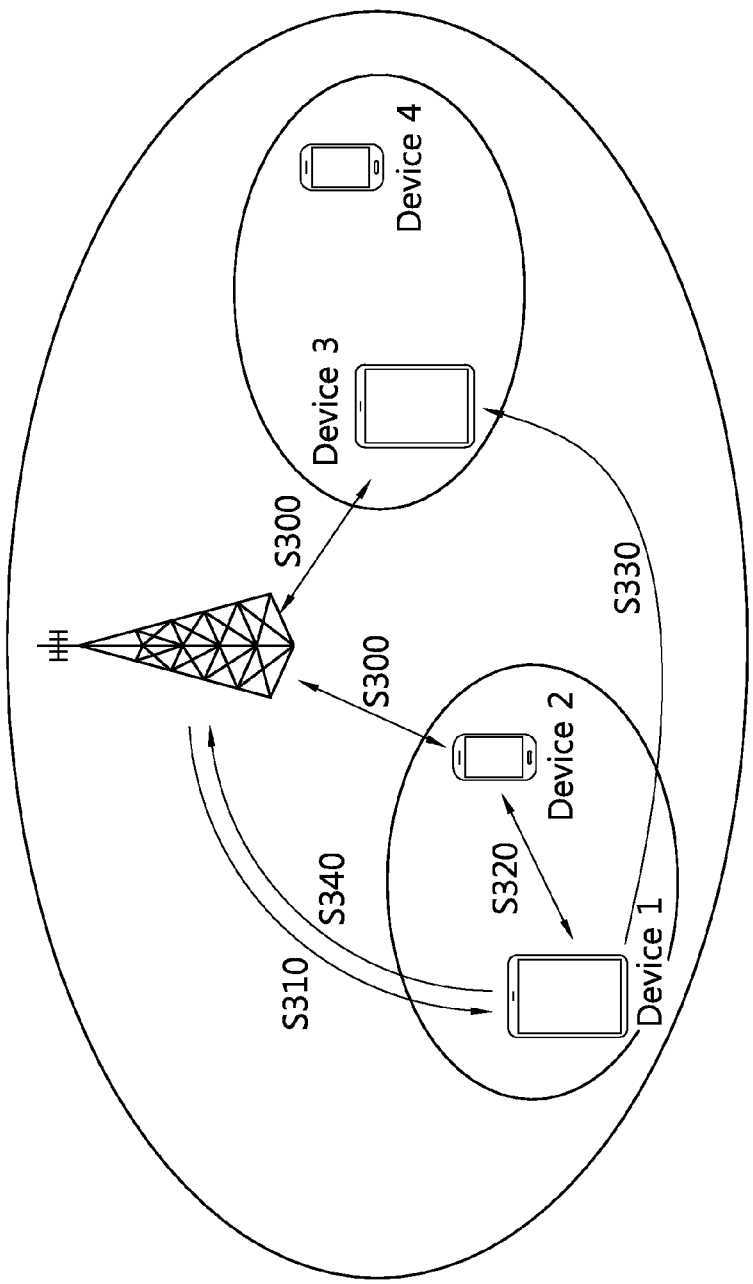
FIG. 9 shows an example of a neighbor discovery procedure performed by a candidate source device according to an embodiment of the present invention.

FIG. 9 shows an example of a neighbor discovery procedure performed by a candidate source device according to an embodiment of the present invention.

Referring to FIG. 9, a BS determines whether a device 2 and a device 3 can be a candidate cooperation device. It is assumed that an index of the device 2 is 0, and a device identifier (ID) such as station ID (STID)/cell radio network temporary identifier (C-RNTI) is A. It is also assumed that an index of the device 3 is 1, and a device ID such as STID/C-RNTI is B. If the device 2 and the device 3 satisfy a condition for being the candidate cooperation device, the BS transmits a MAC message to the device 2 and the device 3 to request an operation of the candidate cooperation device in step S300. In step S310, the BS transmits information on the devices 2 and 3 which are the candidate cooperation device to a device 1 which is a candidate source device.

In step S320, the device 1 which is the candidate source device and the device 2 which is the candidate cooperation device exchange a probe message to perform the client cooperation. In this case, the device 1 can transmit a probe request message to the device 2, and the device 2 can transmit a probe response message in response to the probe request message. It is assumed in the embodiment of FIG. 9 that the device 1 successfully receives the probe response message transmitted by the device 2. In addition, in step S330, the device 1 which is the candidate source device and the device 3 which is the candidate cooperation device exchange a probe message to perform the client cooperation. In this case, the device 1 can transmit the probe request message to the device 3, and the device 3 can transmit the probe response message in response to the probe request message. It is assumed in the example of FIG. 9 that the device 1 fails to receive the probe response message transmitted by the device 3.

In step S340, the device 1 transmits to the BS a MAC message including a MAC address of the device 2 which successfully receives the probe response message. Although it is described herein that the MAC address of the device 2 is included in the MAC message, this is for exemplary purposes only, and thus the MAC message can include a variety of feedback information on the device 2 according to an amount of information on a neighbor device and included in the device 1. For example, if the device 1 knows a device ID (e.g., STID/C-RNTI, etc.) of the device 2 in addition to the MAC address of the device 2, the device 1 can transmit the device ID of the device 2 by inserting it into the MAC message, instead of the MAC address of the device 2. By transmitting a device ID having a less overhead than the MAC address, the device 1 can effectively transmit information on the device 2.

A trigger condition for activating the execution of client cooperation will be described. If one or more candidate cooperation devices exist for one candidate source device, the trigger condition for activating the execution of the client cooperation may be any one or more conditions described below.

A difference of quality of a direct link between a BS and a candidate cooperation device and quality of a direct link between the BS and a candidate source device must be greater than or equal to a first offset.

Quality of an indirect link between the BS and the candidate source device via the candidate cooperation device must be greater than a third threshold. Even if the quality of the direct link between the BS and the candidate source device is not good, if the indirect link between the BS and the candidate source device via the candidate cooperation device is not sufficiently good, there is no reason for the candidate source device to communicate with the BS through the direct link via the candidate cooperation device.

A difference of quality of the indirect link between the BS and the candidate source device via the candidate cooperation device and quality of the direct link between the BS and the candidate source device must be greater than or equal to a second offset.

Even if the quality of the indirect link between the BS and the candidate source device via the candidate cooperation device is sufficiently good, a trigger by which the candidate source device communicates with the BS through the indirect link via the candidate cooperation device is generated when the difference to the quality of the direct link between the BS and the candidate source device is relatively great.

Figure 10:
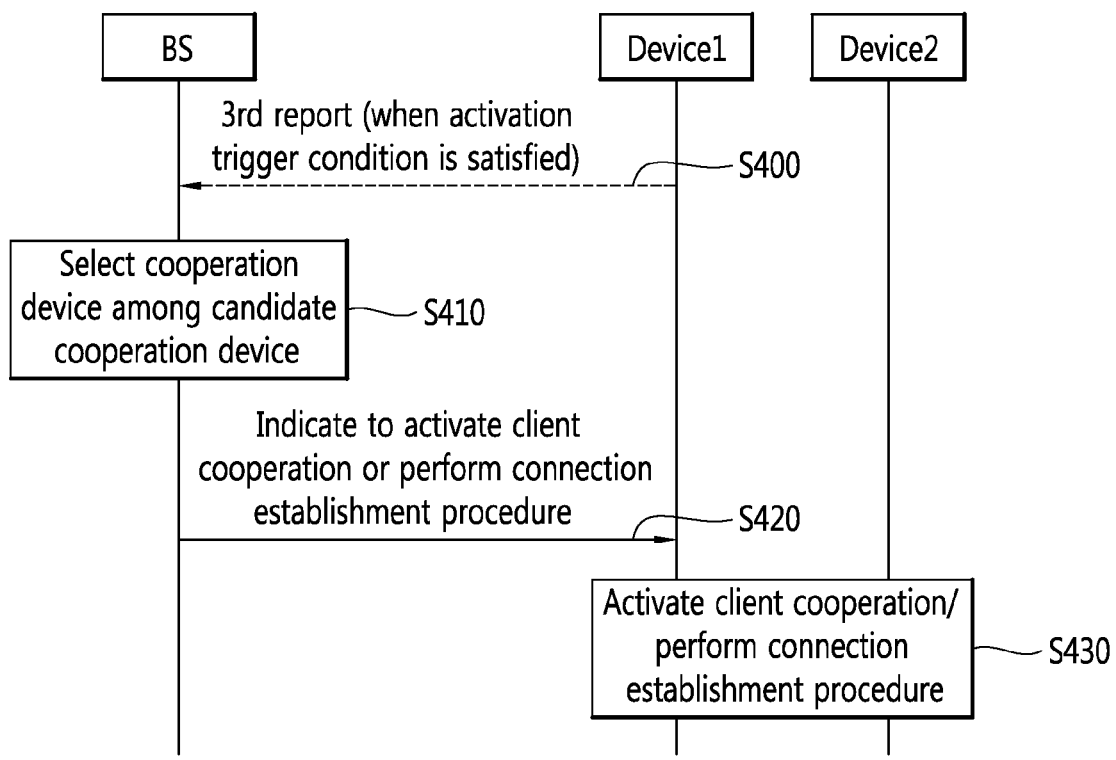
FIG. 10 shows an example of a method of determining a cooperation device which performs client cooperation according to an embodiment of the present invention.

FIG. 10 shows an example of a method of determining a cooperation device which performs client cooperation according to an embodiment of the present invention.

When one or more trigger conditions for activating the execution of the client cooperation are satisfied, a device 1 as a candidate source device which acquires information of a candidate cooperation device through a neighbor discovery procedure or the like can report this to a BS in step S400. This is called a third report for convenience of explanation. The third report may include information on one or more candidate cooperation devices which satisfy the trigger condition for activating the execution of the client cooperation and a measured value mentioned in each trigger condition.

In step S410, the BS selects any one of the candidate cooperation devices as the cooperation device of the client cooperation. The BS can receive the third report from the specific device in step S400, and thereafter can select any one of the candidate cooperation devices as the cooperation device of the client cooperation. That is, the selection of the cooperation device is initiated by the device 1. Alternatively, when one or more trigger conditions for activating the execution of the client cooperation are satisfied, the BS can select any one of the candidate cooperation devices as the cooperation device of the client cooperation instead of receiving the third report from the device 1. That is, the selection of the cooperation device is initiated.

The cooperation device can be selected from the candidate cooperation devices by collectively considering the trigger conditions for activating the execution of the client cooperation described above. That is, the cooperation device for performing the client cooperation can be selected by collectively considering a maximum value of a difference of quality of a direct link between the BS and the candidate cooperation device and quality of a direct link between the BS and the candidate source device, a maximum value of quality of an indirect link between the BS and the candidate source device via the candidate cooperation device, a maximum value of a difference of quality of an indirect link between the BS and the candidate source device via the candidate cooperation device and quality of a direct link between the BS and the candidate source device, a maximum value of capacity of each candidate cooperation device, etc.

When the BS selects one cooperation device, the BS can instruct the candidate source device to activate the execution of the client cooperation or to perform a connection establishment procedure with respect to the selected cooperation device in step S420. In step S430, the candidate source device can activate the execution of the client cooperation or can perform the connection establishment procedure with respect to the selected cooperation device. The candidate source device can activate the execution of the client cooperation or can perform the connection establishment procedure with respect to the selected cooperation device either under an instruction of the BS or autonomously.

Figure 11:
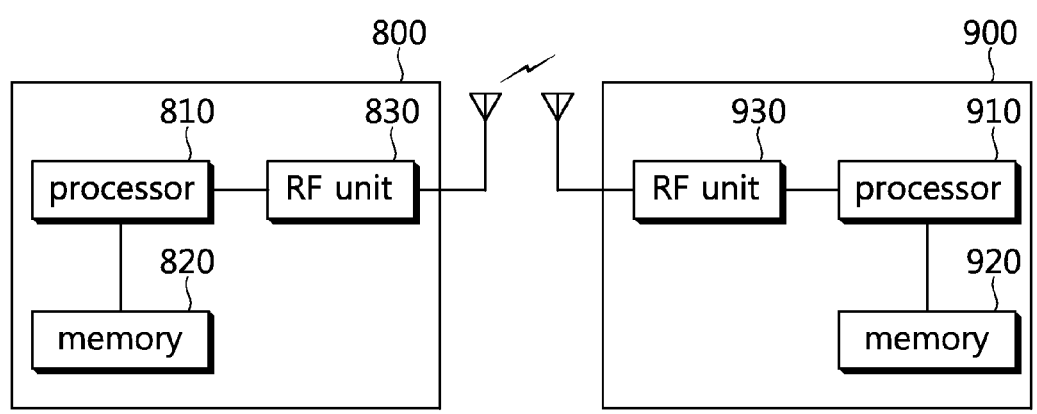
FIG. 11 is a block diagram showing wireless communication system to implement an embodiment of the present invention.

FIG. 11 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for determining, by a base station, cooperative devices of client cooperation in a wireless communication system, the client cooperation helping a source device communicating with the base station through a cooperative device, the method comprising:
   selecting the cooperative device among candidate cooperative devices if at least one of a number of activation trigger conditions is satisfied; and
   indicating client cooperation is to be activated or a connection establishment procedure with the selected cooperative device to a candidate source device is to be performed,
   wherein the activation trigger conditions include:
      a difference between a first quality and a second quality is equal to or greater than a first offset,
      a third quality is greater than a threshold, and
      a difference between the third quality and the second quality is equal to or greater than a second offset,
   wherein the first quality is a quality of a direct link between the base station and the candidate cooperative devices,
   wherein the second quality is a quality of a direct link between the base station and the candidate source device, and
   wherein the third quality is a quality of an indirect link between the base station and the candidate source device through the candidate cooperative devices.

2. The method of claim 1, further comprising receiving a report indicating that the at least one of the activation trigger conditions is satisfied from the candidate source device, before selecting the cooperative device.

3. The method of claim 2, wherein the report includes information on a candidate cooperative device of which the at least one of the activation trigger conditions is satisfied.

4. The method of claim 2, wherein the report includes measurement values corresponding to the satisfied at least one of the activation trigger conditions.

5. The method of claim 1, wherein the cooperative device is selected based on the at least one of the activation trigger conditions and a capacity of each candidate cooperative device.

* * * * *